US005220784A

United States Patent [19]

Wilcox

[11] Patent Number: 5,220,784

[45] Date of Patent: Jun. 22, 1993

[54] GAS TURBINE ENGINE MODULE ASSEMBLY

[75] Inventor: David E. Wilcox, Mesa, Ariz.

[73] Assignee: Allied-Signal Inc., Morris Township, Morris County, N.J.

[21] Appl. No.: 722,065

[22] Filed: Jun. 27, 1991

[51] Int. Cl.[5] .......................... F02C 7/20; B63H 1/00

[52] U.S. Cl. ................................ 60/39.31; 60/39.33; 60/39.75; 416/198 A

[58] Field of Search ................ 60/39.75, 39.31, 39.33, 60/39.161; 29/889.2; 416/198 A

[56] References Cited

U.S. PATENT DOCUMENTS 3,528,241 9/1970 Venable et al. ................ 60/39.161

FOREIGN PATENT DOCUMENTS 579425 8/1946 United Kingdom ........... 416/198 A

*Primary Examiner*—Richard A. Bertsch
*Assistant Examiner*—Howard R. Richman
*Attorney, Agent, or Firm*—James W. McFarland; Robert A. Walsh

[57] ABSTRACT

A gas turbine engine compressor module subassembly construction and associated assembly method and tooling includes a threaded inner bore on the first stage compressor adapted to receive a tubular tool that slips axially between the compressor bores and the engine central shaft. Securement of the accessible tooling to the module's stationary structure permits assembly and handling of the module independently of the engine shaft.

6 Claims, 5 Drawing Sheets

GAS TURBINE ENGINE MODULE ASSEMBLY

TECHNICAL FIELD

This invention pertains to gas turbine engines and pertains more particularly to improved structure and associated tooling for facilitating assembly/removal of modular subassemblies of the engine.

BACKGROUND OF THE INVENTION

Gas turbine engines such as utilized in aircraft are characterized by a relatively highly complex mechanical design of a variety of components. Assembly, aftermarket support, repair and overhaul of such complicated machinery may be time consuming and relatively expensive. To facilitate field support of such engines, more modern designs are modular in concept. This means the engine is designed into a plurality of subassemblies or modules, few in number, which may be individually removed or assembled to the remainder of the engine modules. Thus, such a modularly designed engine allows the removal and replacement of a single module in the field so that the engine may be returned to service as rapidly as possible. The removed module may then be fully disassembled, repaired and/or overhauled at a remote site with minimal overall engine or aircraft down time.

An important consideration in such modularly designed engines is that the components designed to be carried as a single modular subassembly be interrelated to one another regarding frequency of required overhaul and/or susceptibility of failure or damage during the life of the engine. From this it will be apparent that there are economic disadvantages in designing into a single module a group of components having significantly greater life expectancy or overhaul frequency, than another group of components therewithin, since the components with greater life expectancy would be required to be disassembled and replaced from the operating engine at the same frequency as the components with lower life expectancy.

One complexity in designing a modular gas turbine engine relates to the central through shaft assembly which may be typically supported to the engine stationary structure at locations adjacent the forward and aft ends of the engine. The design of a modular subassembly disposed wholly intermediate these shaft supports often leads to difficulties in accessibility and tooling for assembly and disassembly of the intermediate module without disturbing the central shaft assembly.

SUMMARY OF THE INVENTION

Accordingly it is an important object of the present invention to provide a gas turbine engine structure, method, and associated tooling facilitating assembly and removal of a modular engine section having a central shaft assembly extending substantially therethrough.

A more particular object of the present invention is to provide a gas turbine engine module assembly, method and apparatus which may be removed independently of a central shaft assembly extending axially therethrough even though the module has no stationary support structure at one end of the central portion thereof.

More particularly, the invention contemplates a modular gas turbine engine structure wherein a plurality of rotating engine stages are surrounded by a shell-like stationary housing structure, with the inner forwardmost first stage rotor having an internally threaded bore of smaller diameter than the diameters of the other rotor stages in the module. A radial space between the inner diameters of these latter rotors and the outer diameter of the shaft assembly can accept a tubular tool which can be slipped therethrough with its inner end engageable with the threaded smaller diameter central bore of the first stage assembly. The rearward end of the tubular tool is retained in a readily accessible location for subsequent intersecurement with the rearward end of the rotating assembly as well as with the stationary housing structure. Upon such intersecurement the entire modular assembly then may be moved, i.e. assembled or disassembled from the remaining engine while leaving the central shaft assembly in place.

These and other objects and advantages of the present invention are specifically set forth in or will become apparent from the following detailed description of the following preferred embodiments of the invention when read in conjunction with the accompanying drawings.

DETAILED DESCRIPTION OF THE PREFERRED EMBODIMENT

Figure 1:
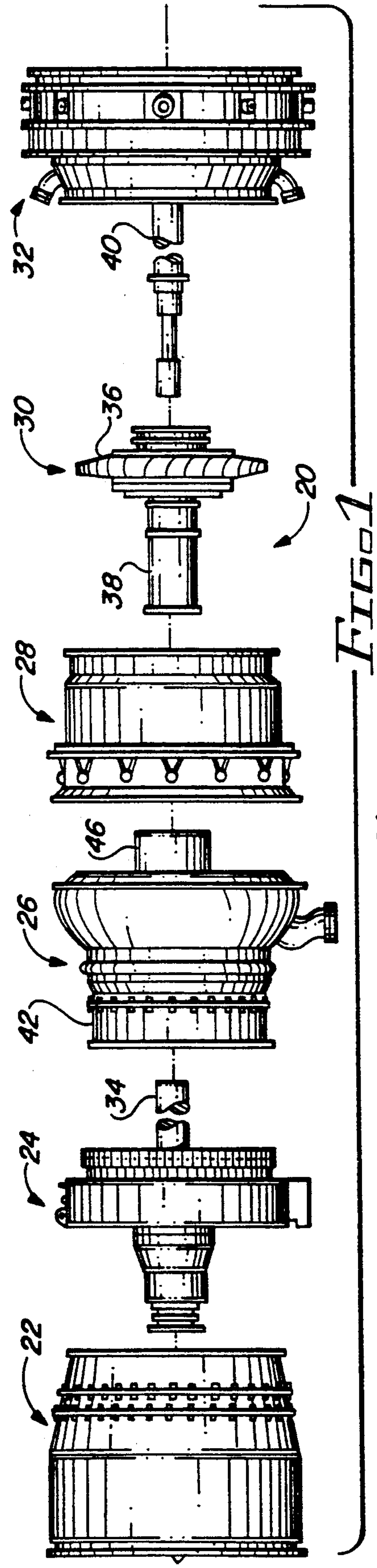
FIG. 1 is an exploded plan view of a modular gas turbine engine incorporating the present invention.
Figure 5:
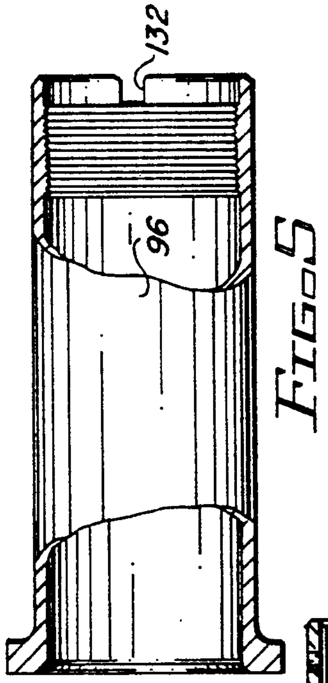
FIGS. 4, 5 and 6 are plan views, with portions broken away for clarity of details, of the three tooling tubular members shown in FIG. 3.
Figure 4:
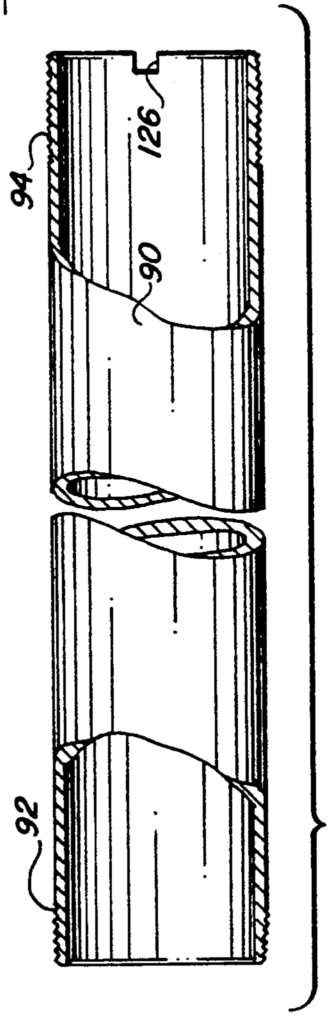
Figure 6:
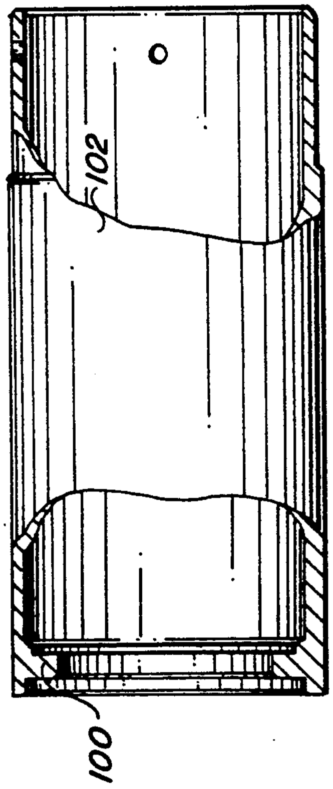

Referring now more particularly to FIG. 1, a modularly constructed gas turbine engine 20 is shown with six major modules thereof in exploded arrangement for clarity. The engine 20 includes sequentially from a forward end to an aft end, a forward fan module 22, a front frame module 24, a compressor module 26, a burner module 28, a high pressure turbine module 30, and a low pressure turbine module 32. Not illustrated are additional modular portions of the engine which are typically included such as an exhaust module. Forward fan module 22 may typically include the front fan receiving the major air inlet flow of a turbo fan or turbo jet engine. Front frame module 24 is characterized by inclusion of various gearing and associated drive mechanisms of the engine accessory drive and includes an elongated tie shaft 34, partially illustrated in FIG. 1, which extends axially rearwardly to the rearward end of the high pressure turbine module 30 as will be discussed in greater detail below. Compressor module 26 includes a plurality of compressor stages and is described in greater detail below, while burner 28 includes the stationary combustor section of the engine. High pressure turbine module 30 includes, in addition to the first stage turbine 36, a hollowed coupling drive 38 that interconnects and drives the various stages of the compressor module 26. Low pressure turbine module 32 includes an elongated inner shaft 40 which extends through all intermediate modular sections to be in driving interengagement with the forward fan in fan module 22.

Figures 2, 2A:
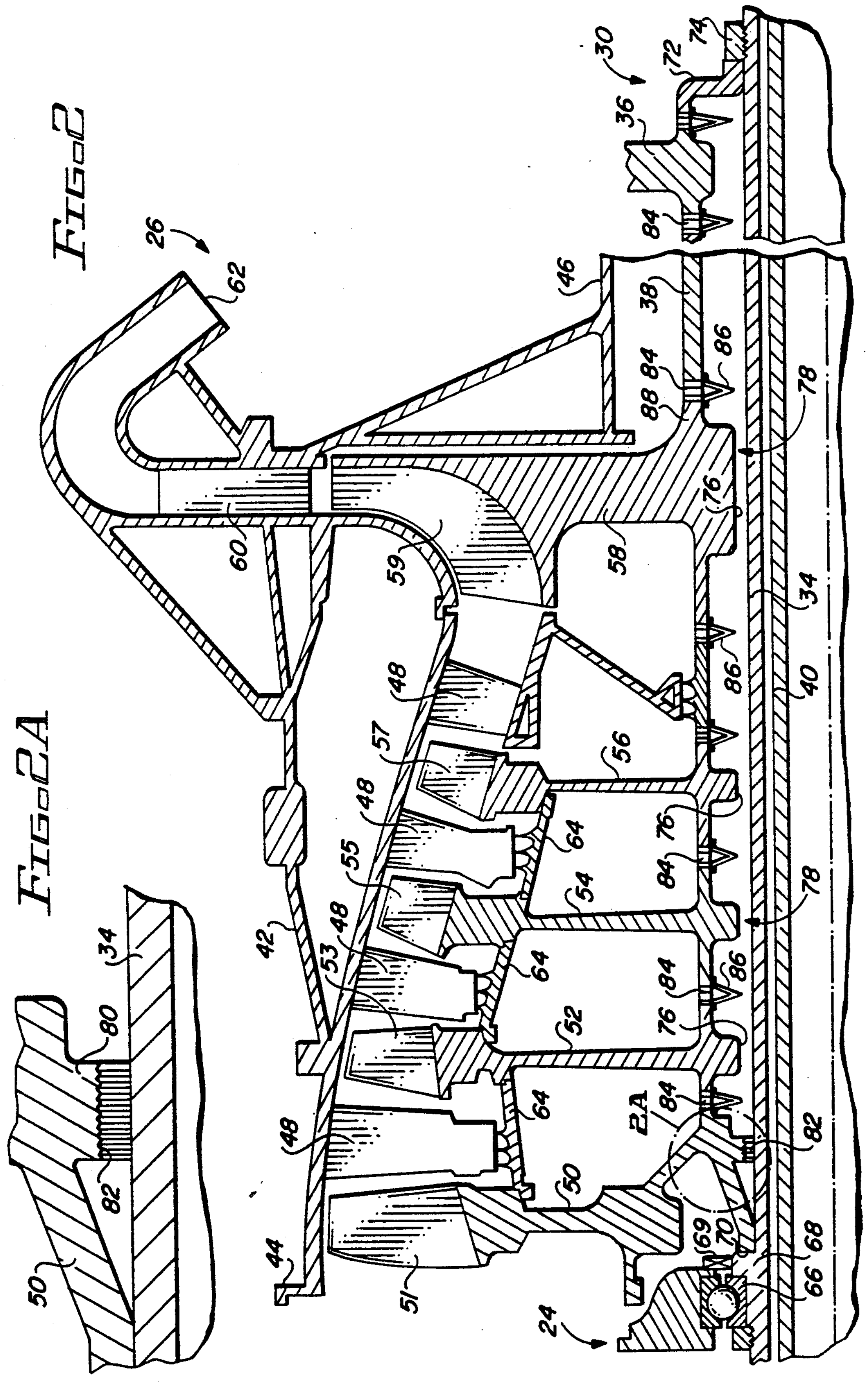
FIG. 2 is an enlarged, partial, cross-sectional plan view of the compressor module, and associated portions of the front frame module and high pressure turbine module, all as assembled in operational arrangement.
FIG. 2A is an enlarged cross-sectional plan view of the portion encircled by the line 2A of FIG. 2.

The present invention is illustrated in association with compressor module 26 which, it will be noted, includes a central shaft assembly (tie shaft 34 and inner shaft 40) which extends completely through the compressor module 26. FIG. 2 illustrates, portions in schematic form, the internalities of the compressor module 26 and associated portions of front frame module 24 and high pressure turbine module 30 as assembled in operational condition. More particularly, for purposes of the present invention the compressor module can be characterized as having an outer, stationary housing support structure or casing 42 which extends circumferentially around in shell-like fashion. The forward end of housing support structure 42 may include a mounting flange 44 for intersecurement with the mating outer housing structure (not shown) of the forwardly positioned front frame module 24. At the rearward end of the compressor module 26 the stationary housing support structure includes a radial inner housing structure 46 which extends axially along and radially inwardly of the burner module 28 located rearwardly of the compressor module 26. Typically the housing support structure 42 carries axially spaced sets of nonrotating vanes 48 which extend radially inwardly from housing structure 42 into an axially extending engine fluid flow path.

Compressor module 26 further includes a plurality of axial compressor stages including first, second, third, and fourth axial compressor rotors 50, 52, 54 and 56, as well as a final stage centrifugal impeller compressor 58. The associated axial compressor blades 51, 53, 55, and 57, are disposed in axial interdigitated relationship between the associated adjacent stationary sets of vanes 48. Blading 59 of the centrifugal compressor impeller 58 directs pressurized air flow across a compressor diffuser 60 to a diffuser outlet 62 for delivery to the combustor of the burner module 28 in well-known fashion. A plurality of rotating shroud seals 64 are included in driven relationship to the compressor rotors and in sealing arrangement with the radially inwardly depending ends of the vanes 48.

A portion of the stationary housing structure 64, disposed near the central portion of the gas turbine engine adjacent the shaft assembly, is also illustrated in FIG. 2. The housing structure 64 is constructed as a part of the forwardly located front frame module 24 and carries a bearing and associated oil seal respectively schematically illustrated at 66 and 69, upon which tie shaft 34 is rotatably mounted and carried. Note tie shaft 34 has an upstanding cylindrical boss 68 in axial interengagement with the forward end face 70 of the first stage compressor rotor 50. The intersecurement of tie shaft 34 with the front frame module housing 64 establishes that for assembly, disassembly, replacement purposes, the tie shaft 34 is a portion of the front frame module 24.

FIG. 2 also illustrates a portion of the high pressure turbine module 30 disposed rearwardly of the compressor module 26, including the hub section of the high pressure turbine rotor 36. Through a coupling 72 the high pressure turbine rotor 36 is intersecured with tie shaft 34 by a shaft nut 74 threadably advancable upon tie shaft 34 for interengagement with coupling 72. The inner shaft 40 of the low pressure turbine module 32 extends axially through the interior of hollow tie shaft 34.

Each of the more rearward compressor rotors 52, 54, 56 and 58 include an internal central through bore 76 of somewhat greater diameter than the outer diameter of tie shaft 34 to define a radial space 78 therebetween for receiving assembly tooling as will be described later. On the other hand, the forwardmost first stage compressor rotor 50 has a radially depending boss portion 80 having a central through bore 82 whose diameter is intermediate the central bore diameter 76 of the other compressors and the outer diameter of tie shaft 34. As clearly shown in FIG. 2A the smaller internal diameter bore 82 is threaded. It is important, of course, that threads 82 be included at a location on rotor 50 wherein stress fisers associated with the threads are acceptable. Near the hub portions of the compressor rotors but at a greater radial location are included axial extending tubular torque transmitting sections having Curvic couplings or radial end face spline configurations 84. The adjacent radial end face or Curvic coupling splines 84 of the compressor rotors are in torque transmitting interengagement with one another, and radially inwardly depending metal ring seals 86 are included to cover the openings between the intermeshing teeth of the Curvic couplings 84 for fluid sealing purposes. At the rearward or outer end 88 of the last centrifugal compressor stage 76 the associated radial end face spline 84 is similarly arranged in torque transmitting interengagement with the torque tube coupling 38 associated with the high pressure turbine section 30. The opposite end of torque coupling 38 is similarly interconnected through a Curvic coupling 84 with the high pressure turbine rotor 36.

Such Curvic couplings 84 operate to transmit torque through the rotating components but do not axially rigidly intersecure the rotating stages with one another. In this regard, engine tie shaft 34 provides the axial intersecurement of the rotor stages 50, 52, 54, 56, 58 with the torque coupling 38 and high pressure turbine rotor 36 during engine operation. More particularly, conventional engine assembly contemplates that prior to the mounting of nut 74, the tie shaft 34 is axially stretched in a rearward direction (rightwardly in the FIG. 2 orientation) while being held upon housing 64 to place the tie shaft 34 in high axial tension. Upon snugly threading shaft nut 74 into engagement with coupling 72 the rotating group of the compressor section 26 as well as the high pressure turbine rotor hub of high pressure turbine rotor 36 are all placed in complementary axial compression to rigidly axially intersecure this rotating group.

Upon viewing the operational arrangement of the compressor module 26 as shown in FIG. 2 it will be apparent that certain difficulties arise in attempting to disassemble the module 26 from the forward rotor module 4 (with its associated tie shaft 34) without disturbing the tie shaft 34 and without disassembly or relative motion of any of the internal components of compressor module 26. To this end, during disassembly which occurs from the rearward end of the engine, the low pressure turbine module 32 (with inner shaft 40), high pressure turbine module 30 and burner module 28 are sequentially removed as units from the engine. For subsequent removal of compressor section 26, the mounting flange 44 of the stationary housing support structure 42 is readily accessible for release from the front frame module. Similarly, the inner housing section 46 is at a readily accessible location at the rearward end of the compressor module. However, there exists no centrally located stationary housing structure near the first stage compressor rotor 50 which is associated with compressor module 26. In this respect the central housing portion 64 is a part of and is to remain with the front frame module 24 upon removal of the compressor module 26. Additionally, it will be apparent that after removal of the high pressure turbine module 30 the outer end of the rotating group of components of compressor module 26 becomes the rear portion 88 of impeller compressor 58.

FIGS. 3-7 illustrate the forward or inner end and rearward or outer end of the compressor module 26 in association with the modular handling and transport tooling as contemplated by the present invention. More particularly this transport tooling includes an elongated tubular tool 90 having a threaded inner end 92. Tube 90 is hollow and is sized with a wall thickness capable of being inserted over the outer diameter of tie shaft 34 and fittable within the radial space 78 (FIG. 2) between the compressor rotor central bore 76 and the outer diameter of tie shaft 34. The threaded inner end 92 after insertion of the tool 90 through space 78 is threadably engageable with the threaded smaller diameter bore 82 of the forward most compressor rotor stage 50 by simple rotation of tubular tool 90. An outer end portion 94 of the tubular tool 90 remains in a readily accessible location exteriorly of stationary structure 46 and in surrounding relationship to the tie shaft 34 disposed within the interior of tool 90.

Figure 3:
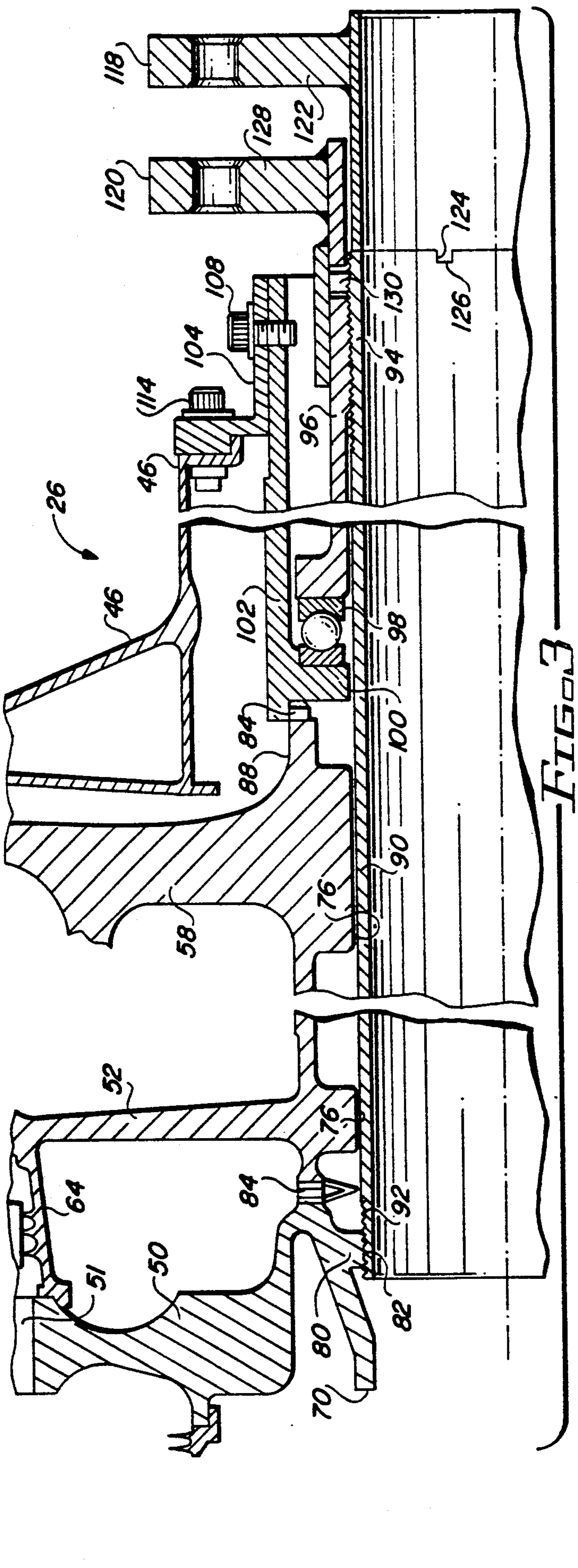
FIG. 3 is a partial cross-sectional plan view of opposite ends of the compressor assembly along with tooling for assembly/disassembly of the compressor module.
Figure 7:
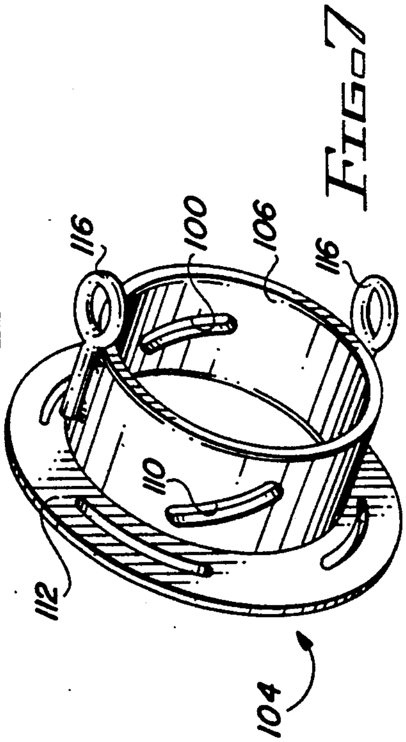
FIG. 7 is a perspective view of the collar tooling of FIG. 3.

Additional handling and assembly tooling as illustrated in FIG. 3 includes a second tubular tool member 96 threadably received on outer end portion 94 and acting axially through an optional bearing 98 to bear against a radially inwardly depending flange 100 of a third tubular tool 102. An inner face of flange 100 is axially engageable with the radial end face spline 84 associated with the outer end 88 of the compressor impeller 58. Further, the tooling includes an adjustable collar 104 having an axially extending cylindrical portion 106 securable to third member 102 through bolts 108 passing through arcuate slots 110 in cylindrical section 106. Collar 104 also includes a radially upstanding flange 112 securable through bolts 114 to the stationary structure 46 of the compressor module 26. The arcuate shaped slots 110, allow adjustable intersecurement of the stationary housing structure 46 to the rotating components of the compressor module. This affords fine relative axial location of the rotating group in relation to the stationary structure by rotation of collar 112 before intersecurement thereof through bolts 108 and 114. Collar 104 further includes lifting eyelet-type hooks 116 which may be secured to hoisting mechanism to effect the axial shifting and movement of the entire compressor module 26 as a unitary module.

To facilitate mounting of the threaded internal end 92 of the tubular tool 90 onto and off of the threaded central bore 82 of the first compressor stage, a pair of wrenches 118, 120 may be utilized. Wrench 118, in addition to a graspable radial arm 122, includes axially extending prongs 124 which are insertable into one or more complementary grooves 126 in the tubular tool 90. Similarly, the wrench 120 has a radial arm 128 and axially inwardly depending prongs 130 receivable in complementary grooves 132 in the second tool 96. The two radial arms 122, 128 of the wrenches may be relatively rotated to facilitate rotation of tool 90 into threaded interengagement with the threaded bore 82.

As shown in FIG. 3, the tubular tool 92 axially intersecures the various rotating components of the compressor module by virtue of the threaded interengagement at its inner end 92 with the innermost compressor wheel 50, and by virtue of the axial engagement of the associated second tool 96 acting through flange 100 against the outer end 88 of the rotating components. Thus tubular tool 90 intersecures the rotating group as a unitary group.

Tool 102 also operably intersecures both the entire rotating group and the tubular tool 90 to the outer stationary structure 46. Tool 102 thereby interlocks all components of the compressor module 26 in the disposition illustrated in FIG. 3. Subsequent removal and/or assembly of the entire compressor module 26 relative to the forward front frame module 24 is accomplished by axial lifting or lowering of the compressor module 26 through hoist mechanism (not shown) coupled to eyelet hooks 116. The compressor module 26 is readily removed from the front frame module 24 by rearward shifting of the unit to move the end face 70 of the first compressor stage away from the adjacent land 68 of the tie shaft 34.

Figure 10:
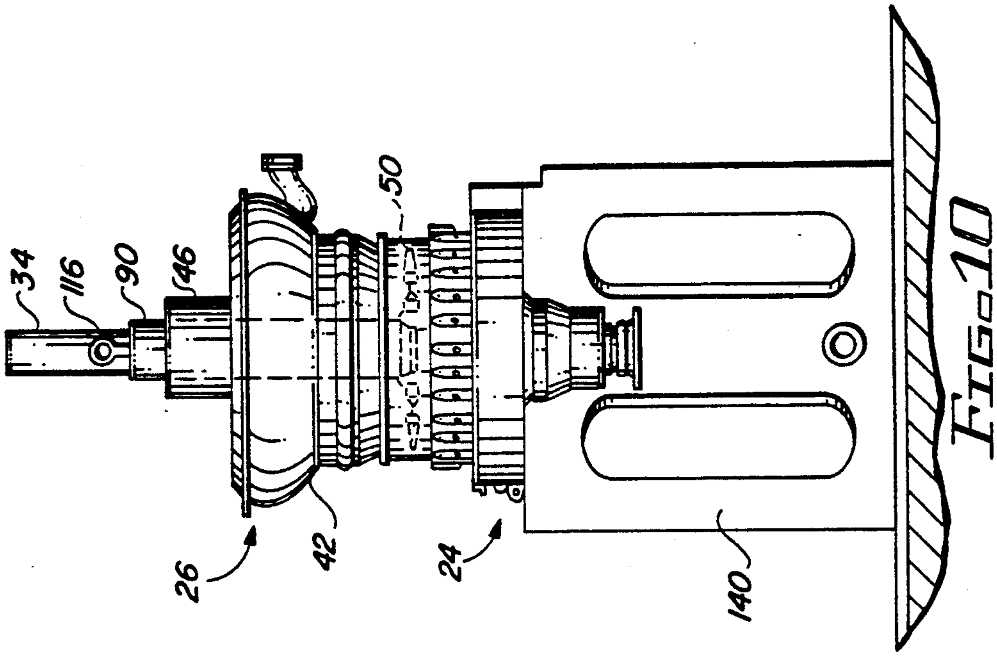
FIG. 10 is a view similar to FIG. 8 but showing the compressor module assembled on to the front frame module.
Figure 9:
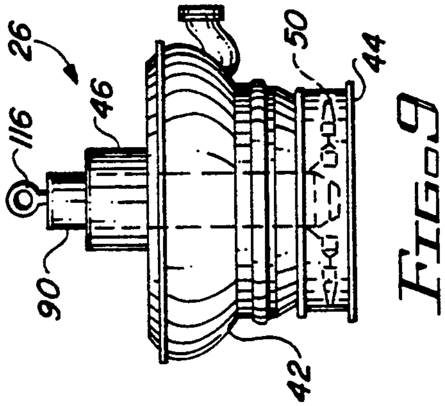
FIG. 9 is a elevational view of the compressor module assembly with associated tooling preparatory to assembly thereof upon the front frame module.
Figure 8:
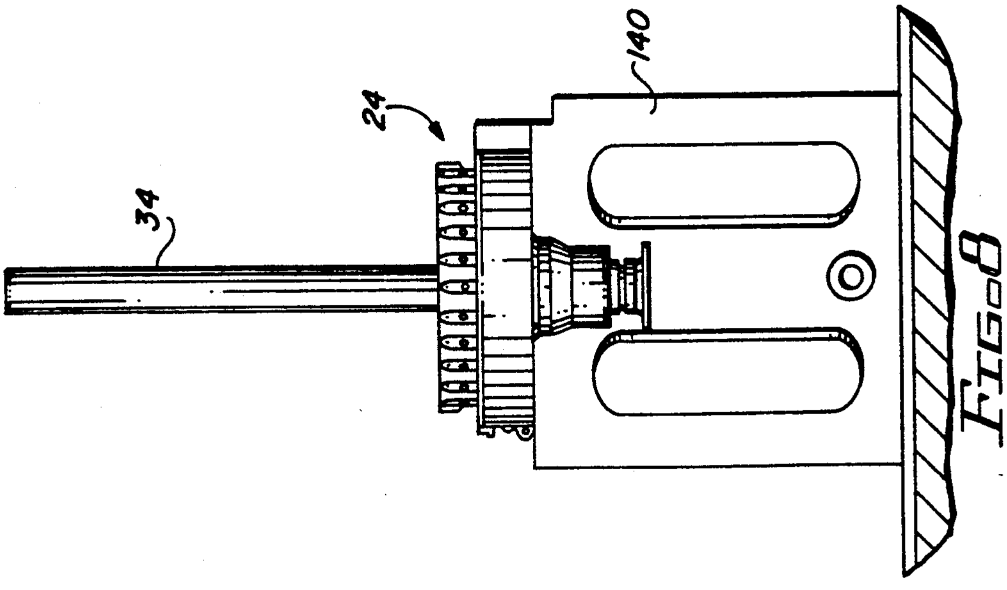
FIG. 8 is an elevational depiction of the front frame module as prepared for further assembly of the compressor module.

Assembly and handling of the compressor module is further illustrated in FIGS. 8-10. In FIG. 8 the forward front frame module 24 is illustrated in vertical assembly position upon an assembly stand 140. The vertically upstanding tie shaft 34 appears prominently in FIG. 8. FIG. 9 shows the compressor module 26 and associated tooling 90 in vertical disposition preparatory to assembly. In FIG. 10 it will be apparent that the compressor module 26 has been hoisted by hooks 116, slipped over tie shaft 34 and then lowered onto the front frame module 24. After placement on the front frame module as shown in FIG. 10 the tooling 90, 96, 102, and 106 are removed in reverse fashion from that described.

Thus, even though the compressor module 26 includes centrally disposed rotating elements wherein there is no stationary structure adjacent the innermost central portion of the compressor module, the module is transportable as a single unit for assembly/disassembly to the other engine modules without disturbing the tie shaft 34. Additionally, with the tooling 90 carried therewith the compressor module 26 is readily transportable without impacting the internal interrelationships of the preassembled components thereof.

Figure 11:
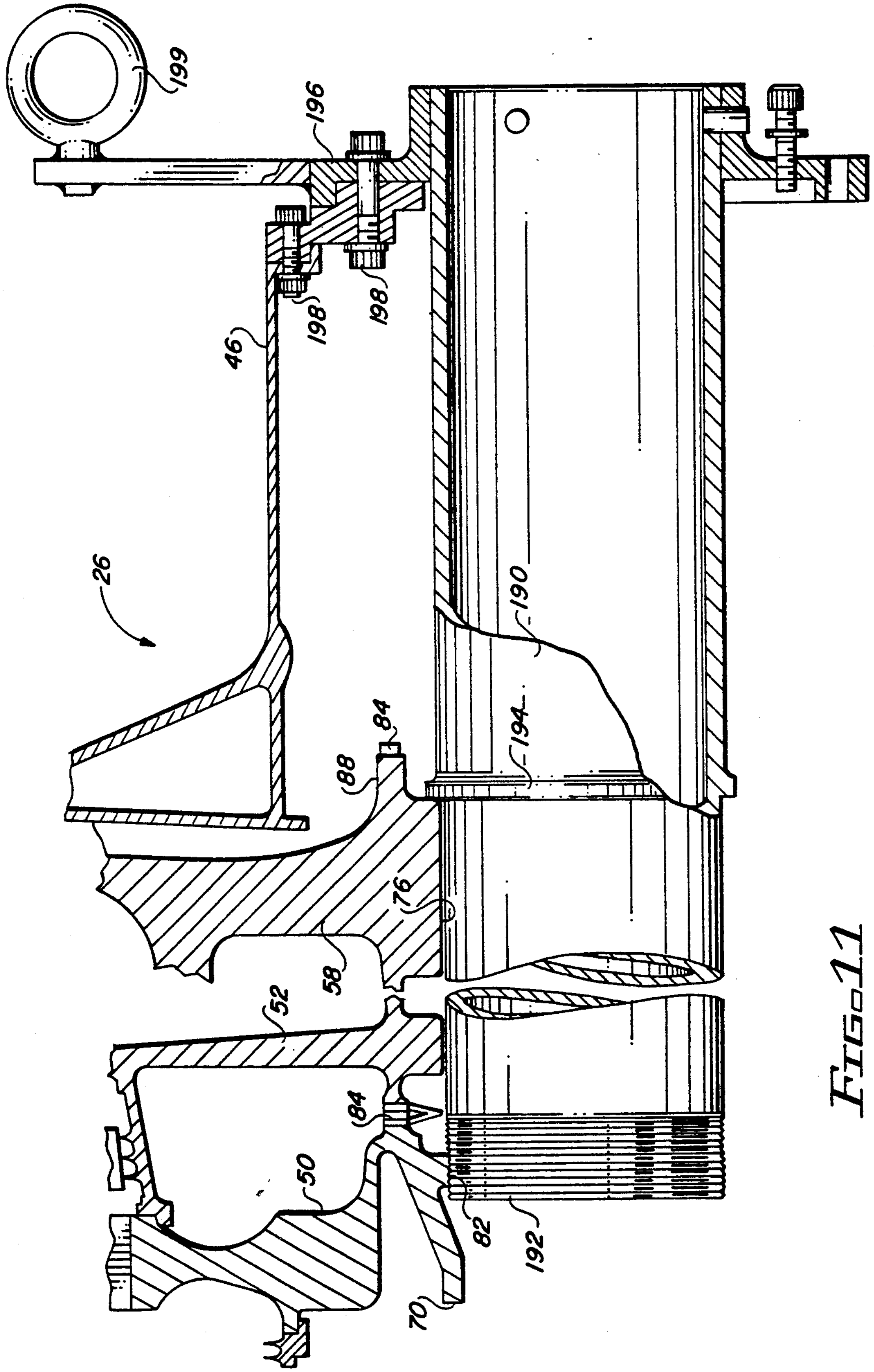
FIG. 11 is a view similar to view FIG. 3 but showing an alternate embodiment of the assembly tooling as contemplated by the present invention.

FIG. 11 illustrates another embodiment of the handling/assembly tooling as contemplated by the present invention for handling the same compressor module 26 as illustrated in FIG. 3. The tooling of FIG. 11 includes a single hollow tubular tool 190 with threaded inner end 192 engageable with the threaded bore 82 of first compressor 50, and further includes an upstanding radial collar 194 near the mid length thereof which is engageable with the central hub section of the last compressor impeller 58 upon axial advancement of end 192 upon threaded bore 82. Contact of collar 194 with compressor impeller 58 axially intersecures the rotating group of compressor module 26. Additionally, the tubular tool 190 is outfitted with a radial end face member 196 which is rigidly securable to the stationary structure 46 of compressor module 26 by bolts 198 or the like. Again, a grasping hook 199 is associated with the tooling 190 to facilitate axial shifting of the compressor module 26 as a unit. During assembly/disassembly the tooling of FIG. 11 operates as discussed previously with respect to the FIG. 3 embodiment.

Various alterations and modification to the present invention will be apparent to those skilled in the art. Accordingly the foregoing detailed description of preferred forms of the invention should be considered exemplary in nature and not as limiting to the scope and spirit of the invention as set forth in the appended claims.

Having described the invention with sufficient clarity that those skilled in the art may make and use it, what is claimed is:

1. A gas turbine engine comprising:

a stationary housing;

a central rotary shaft rotatably secured to said housing at a forward location along the axial length of said shaft, said shaft having a radially outwardly extending face at said forward location;

an axially spaced set of stationary vanes secured to said housing and extending radially inwardly into a fluid flow path extending axially along said shaft in radially surrounding relation thereto;

a plurality of axially paced rotors disposed in torque transmitting interengagement, said rotors having central bores and blades extending radially outwardly into said flow path in interdigitated relation to said vanes;

the forwardmost of said plurality of rotors having a forward face in axial engagement with said face of the shaft, said central bore of said forwardmost rotor being of a selected diameter greater than the outer diameter of said shaft, said central bores of the remainder of said plurality of rotors having diameters greater than said selected diameter to define a radial space between said shaft and said remainder of said plurality of rotors, said radial space adapted to receive tubularly shaped assembly tooling, said forwardmost rotor having an inner section disposed radially inwardly of said central bores of said remainder of rotors, said inner section being configured to complementally receive and intersecure with the end of the tubularly shaped assembly tooling inserted through said radial space.

2. A gas turbine engine as set forth in claim 1, wherein each of said plurality of motors has radial end face splines in torque transmitting engagement with the end face splines of the adjacent rotor.

3. A gas turbine engine as set forth in claim 2, wherein said plurality of rotors comprises a plurality of compressor rotors, said engine further comprising a turbine rotor disposed axially rearwardly of said compressor rotors and mounted in torque transmitting engagement therewith.

4. A gas turbine engine as set forth in claim 2, wherein said inner section of the forwardmost rotor has internal threads thereon adapted to receive an externally threaded end of the tubularly shaped assembly tooling inserted through said radial space.

5. A gas turbine engine module and transport tooling therefor comprising:

radially outer stationary housing structure;

axially spaced sets of stationary vanes extending radially inwardly from said housing structure into an axially extending fluid flow path;

a plurality of compressor wheels having blades extending radially outwardly into said flow path in interdigitated relation to said vanes, said wheels being in torque transmitting interengagement, the forwardmost one of said said wheel having a threaded bore, the remainder of said wheel having central bores of larger diameter than said threaded central bore;

a tubular member of greater axial length than the total axial length of said plurality of wheels, and an outer diameter smaller than the central bores of the remainder of said wheels, said tubular member having an externally threaded end in engagement with said threaded central bore of the forwardmost one of said wheels; and means carried with said tubular member for axially securing the rearwardmost one of said plurality of wheels with said tubular member and with said stationary housing structure.

6. A unitary module including a gas turbine engine compressor subassembly and transport tooling, said unitary module adapted to be assembled and disassembled as a unit upon an axially extending central shaft, said unitary module comprising:

radially outer stationary housing structure;

axially spaced set of stationary vanes extending radially inwardly into an axially extending fluid flow path;

a plurality of compressor disks having blades extending radially outwardly into said flow path in interdigitated relation to said vanes, said disks being in torque transmitting interengagement, the forwardmost one of said disks having a threaded central bore, the remainder of said disks having central bores of larger diameter than said threaded central bore;

assembly tooling including a hollow tubular tool received through said central bores of the remainder of said disks, the inner diameter of said tool being greater than the maximum diameter of the engine shaft, a forward end of said tool being releasably intersecured to said threaded central bore;

means for securing a rearward end of said tool to said stationary housing; and a midsection ring secured to the outer surface of said tool and extending radially outward to a diameter greater than said central bore of the rearwardmost one of said disks, said midsection ring being in axial contact with said rearwardmost compressor disk upon securement of said forward end of the tool to said threaded central bore.

* * * * *